US010909812B2

(12) United States Patent
Chim et al.

(10) Patent No.: US 10,909,812 B2
(45) **Date of Patent: *Feb. 2, 2021**

(54) METHOD OF GAMING AND A GAMING SYSTEM

(71) Applicant: Aristocrat Technologies Australia Pty Ltd., North Ryde (AU)

(72) Inventors: Chi We Chim, Beecroft (AU); Damien Burczyk, Henderson, NV (US); Yanis Tsombanidis, Las Vegas, NV (US)

(73) Assignee: Aristocrat Technologies Australia Pty Ltd.

( * ) Notice: Subject to any disclaimer, the term of this patent is extended or adjusted under 35 U.S.C. 154(b) by 17 days.

This patent is subject to a terminal disclaimer.

(21) Appl. No.: 16/275,455

(22) Filed: Feb. 14, 2019

(65) Prior Publication Data

US 2019/0180568 A1 Jun. 13, 2019

Related U.S. Application Data

(63) Continuation of application No. 15/437,142, filed on Feb. 20, 2017, now Pat. No. 10,249,143, which is a continuation of application No. 13/079,070, filed on Apr. 4, 2011, now Pat. No. 9,576,435.

(60) Provisional application No. 61/321,319, filed on Apr. 6, 2010.

(51) Int. Cl.
*A63F 13/00* (2014.01)
*G07F 17/32* (2006.01)

(52) U.S. Cl.
CPC .......... *G07F 17/3281* (2013.01); *G07F 17/32* (2013.01); *G07F 17/3223* (2013.01); *G07F 17/3246* (2013.01); *G07F 17/3248* (2013.01); *G07F 17/3255* (2013.01); *G07F 17/3262* (2013.01)

(58) Field of Classification Search
CPC ............ G07F 17/3267; G07F 17/3213; G07F 17/3244; G07F 17/32
See application file for complete search history.

(56) References Cited

U.S. PATENT DOCUMENTS

| | | | |
|---|---|---|---|
| 6,802,136 B2 | 10/2004 | Merchant | |
| 2002/0111212 A1 | 8/2002 | Muir | |
| 2002/0151357 A1 | 10/2002 | Acres | |
| 2002/0183105 A1* | 12/2002 | Cannon | G07F 17/3267 463/16 |
| 2002/0198044 A1 | 12/2002 | Walker et al. | |
| 2003/0104856 A1 | 6/2003 | Wolf | |

(Continued)

FOREIGN PATENT DOCUMENTS

| | | |
|---|---|---|
| WO | 2006028780 A2 | 3/2006 |
| WO | 2006039366 A2 | 4/2006 |

OTHER PUBLICATIONS

Examiner's First Report for Application No. 2011201567 dated May 11, 2012, pp. 1-2.

*Primary Examiner* — Omkar A Deodhar
*Assistant Examiner* — Eric M Thomas
(74) *Attorney, Agent, or Firm* — McAndrews, Held & Malloy, Ltd.

(57) ABSTRACT

A gaming method including conducting a first game at a first gaming device for a first player; conducting a second game at a second gaming device for a second player; modifying play of the first game based on play of the second game; and modifying play of the second game based on play of the first game.

20 Claims, 7 Drawing Sheets

(56) References Cited

U.S. PATENT DOCUMENTS

2003/0176220 A1 9/2003 Baerlocher
2003/0224852 A1* 12/2003 Walker .................... G07F 17/32 463/20
2004/0018872 A1 1/2004 Baerlocher et al.
2004/0043815 A1 3/2004 Kaminkow
2004/0048644 A1 3/2004 Gerrard et al.
2004/0048649 A1 3/2004 Peterson et al.
2004/0063493 A1 4/2004 Baerlocher
2004/0147306 A1 7/2004 Randall et al.
2004/0152500 A1 8/2004 Baerlocher
2004/0248638 A1 12/2004 Dore
2005/0054419 A1 3/2005 Souza et al.
2005/0124407 A1 6/2005 Rowe
2005/0143164 A1 6/2005 Duhamel et al.
2005/0233795 A1 10/2005 Wolf
2005/0233796 A1 10/2005 Baerlocher et al.
2006/0073868 A1 4/2006 Nordman
2006/0100009 A1 5/2006 Walker et al.
2006/0111172 A1 5/2006 Walker et al.
2006/0111178 A1 5/2006 Gallaway et al.
2006/0121971 A1* 6/2006 Slomiany ................ G07F 17/32 463/16
2006/0160614 A1 7/2006 Walker
2006/0178187 A1 8/2006 Walker et al.
2006/0211470 A1 9/2006 Walker et al.
2006/0211471 A1 9/2006 Walker et al.
2006/0211472 A1 9/2006 Walker et al.
2006/0211473 A1 9/2006 Walker et al.
2006/0211474 A1 9/2006 Walker et al.
2006/0217173 A1 9/2006 Walker et al.
2006/0217174 A1 9/2006 Walker et al.
2006/0223606 A1 10/2006 Walker et al.
2006/0223607 A1 10/2006 Walker et al.
2006/0223608 A1 10/2006 Walker et al.
2006/0240890 A1 10/2006 Walker et al.
2006/0287054 A1 12/2006 Walker et al.
2007/0015572 A1 1/2007 Baerlocher
2007/0077978 A1 4/2007 Walker et al.
2007/0155463 A1 7/2007 Ghaly
2007/0167216 A1 7/2007 Walker et al.
2007/0173315 A1 7/2007 Law
2007/0191107 A1 8/2007 Walker
2007/0298861 A1 12/2007 Englman et al.
2007/0298867 A1 12/2007 Huang
2008/0020817 A1 1/2008 Kaminkow et al.
2008/0020842 A1 1/2008 Kaminkow et al.
2008/0026840 A1 1/2008 Souza et al.
2008/0045330 A1 2/2008 Chim
2008/0051168 A1 2/2008 Kaminkow et al.
2008/0058078 A1 3/2008 Fong
2008/0064487 A1 3/2008 Stevens et al.
2008/0070702 A1 3/2008 Kaminkow et al.
2008/0076519 A1 3/2008 Chim
2008/0076520 A1 3/2008 Chan et al.
2008/0132311 A1 6/2008 Walker
2008/0146325 A1 6/2008 Walker et al.
2008/0200251 A1 8/2008 Alderucci et al.
2008/0214308 A1 9/2008 Lyons et al.
2008/0274801 A1 11/2008 Bryant et al.
2009/0011824 A1 1/2009 Englman et al.
2009/0098920 A1 4/2009 Toompere
2009/0111574 A1 4/2009 Rowe
2009/0117972 A1 5/2009 Cava
2009/0124379 A1 5/2009 Wells
2009/0131155 A1 5/2009 Hollibaugh et al.
2009/0131174 A1 5/2009 Hutchinson-Kay et al.
2009/0176556 A1 7/2009 Gagner et al.
2009/0239636 A1 9/2009 Lankots
2009/0253483 A1 10/2009 Pacey et al.
2009/0258695 A1 10/2009 Graham et al.
2009/0270163 A1 10/2009 Mitelman
2009/0275410 A1 11/2009 Kisenwether et al.
2009/0275411 A1 11/2009 Kisenwether et al.
2009/0291745 A1 11/2009 Shai-Hee
2009/0291752 A1 11/2009 Anderson et al.

* cited by examiner

METHOD OF GAMING AND A GAMING SYSTEM

RELATED APPLICATIONS

The present application is a continuation of U.S. patent application Ser. No. 15/437,142, filed Feb. 20, 2017, which is a continuation of U.S. patent application Ser. No. 13/079,070, filed Apr. 4, 2011, which issued as U.S. Pat. No. 9,576,435 on Feb. 21, 2017, which claims priority to U.S. Provisional Patent Application Ser. No. 61/321,319 filed Apr. 6, 2010. Each of the above-mentioned prior-filed applications is hereby expressly incorporated herein by reference in its entirety.

BACKGROUND OF THE INVENTION

The present invention relates to a method of gaming and a gaming system.

In some gaming venues, a plurality of gaming machines are arranged to provide a group game where more than one player can take part. A common arrangement involves placing the gaming machines close to one another. Typically, a group game is played as a separate game from the individual base games.

BRIEF SUMMARY OF THE INVENTION

In a first aspect, the invention provides a method of gaming, comprising:

- conducting a first game at a first gaming device for a first player;
- conducting a second game at a second gaming device for a second player;
- modifying play of the first game based on play of the second game; and
- modifying play of the second game based on play of the first game.

In an embodiment, the method comprises initiating the first game in response to a trigger condition being met.

In an embodiment, the method comprises initiating the second game in response to the first game being initiated.

In an embodiment, the method comprises initiating the second game in response to a trigger condition being met.

In an embodiment, the method comprises initiating the first game in response to the second game being initiated.

In an embodiment, the method comprises terminating the first game in response to the second game being terminated.

In an embodiment, the method comprises terminating the second game in response to the first game being terminated.

In an embodiment, modifying play of the second game comprises awarding a benefit to the second player upon a first modifier condition being met in the first game.

In an embodiment, the first modifier condition is the collection of a special symbol in the first game.

In an embodiment, modifying play of the first game comprises awarding a benefit to the first player upon a second modifier condition being met in the second game.

In an embodiment, the second modifier condition is the collection of a special symbol in the second game.

In an embodiment, modifying play of the first game comprises awarding a benefit to the first player.

In an embodiment, modifying play of the second game comprises awarding a benefit to the second player.

In an embodiment, awarding a benefit comprises extending game play.

In an embodiment, awarding a benefit comprises making an award.

In an embodiment, the award comprises at least one bonus credit.

In an embodiment, the award comprises at least one free game.

In an embodiment, making an award comprises applying a modifier.

In an embodiment, one or both of the first and second games are feature games.

In an embodiment, the first game is different to the second game.

In an embodiment, conducting a first game further comprises displaying the first game on an overhead display.

In an embodiment, conducting a second game further comprises displaying the second game on an overhead display.

In a second aspect, the invention provides a gaming system comprising:

- a first gaming device arranged to enable a first player to play a first game; and
- a second gaming device arranged to enable a second player to play a second game,
- the first gaming device being arranged to modify play of the first game based on play of the second game and the second gaming device being arranged to modify play of the second game based on play of the first game.

In an embodiment, the first gaming device comprises a first game initiator arranged to initiate the first game in response to a trigger condition being met.

In an embodiment, the second gaming device comprises a second game initiator arranged to initiate the second game in response to the first game being initiated.

In an embodiment, the second gaming device comprises a second game initiator arranged to initiate the second game in response to a trigger condition being met.

In an embodiment, the first gaming device comprises a first game initiator arranged to initiate the first game in response to the second game being initiated.

In an embodiment, the first gaming device comprises a first game terminator arranged to terminate the first game in response to the second game being terminated.

In an embodiment, the second gaming device comprises a second game terminator arranged to terminate the second game in response to the first game being terminated.

In an embodiment, the second gaming device comprises a second game play controller arranged to award a benefit to the second player upon a first condition being met in the first game.

In an embodiment, the first modifier condition is the collection of a special symbol in the first game.

In an embodiment, the first gaming device comprises a first game play controller arranged to award a benefit to the first player upon a second modifier condition being met in the second game.

In an embodiment, the second modifier condition is the collection of a special symbol in the second game.

In an embodiment, the first gaming device comprises a first game play controller arranged to award a benefit to the first player.

In an embodiment, the second gaming device comprises a second game play controller arranged to award a benefit to the second player.

In an embodiment, the benefit is the extension of game play.

In an embodiment, the benefit is the making of an award.

In an embodiment, the award comprises at least one bonus credit.

In an embodiment, the award comprises at least one free game.

In an embodiment, the award is the application of a modifier.

In an embodiment, one or both of the first and second games are feature games.

In an embodiment, the first game is different to the second game.

In an embodiment, the gaming system comprises an overhead display arranged to display one or both of the first and second games.

BRIEF DESCRIPTION OF SEVERAL VIEWS OF THE DRAWINGS

Embodiments of the invention are described in relation to the accompanying drawings, in which.

DETAILED DESCRIPTION OF THE INVENTION

Overview of Gaming System

Figure 1:
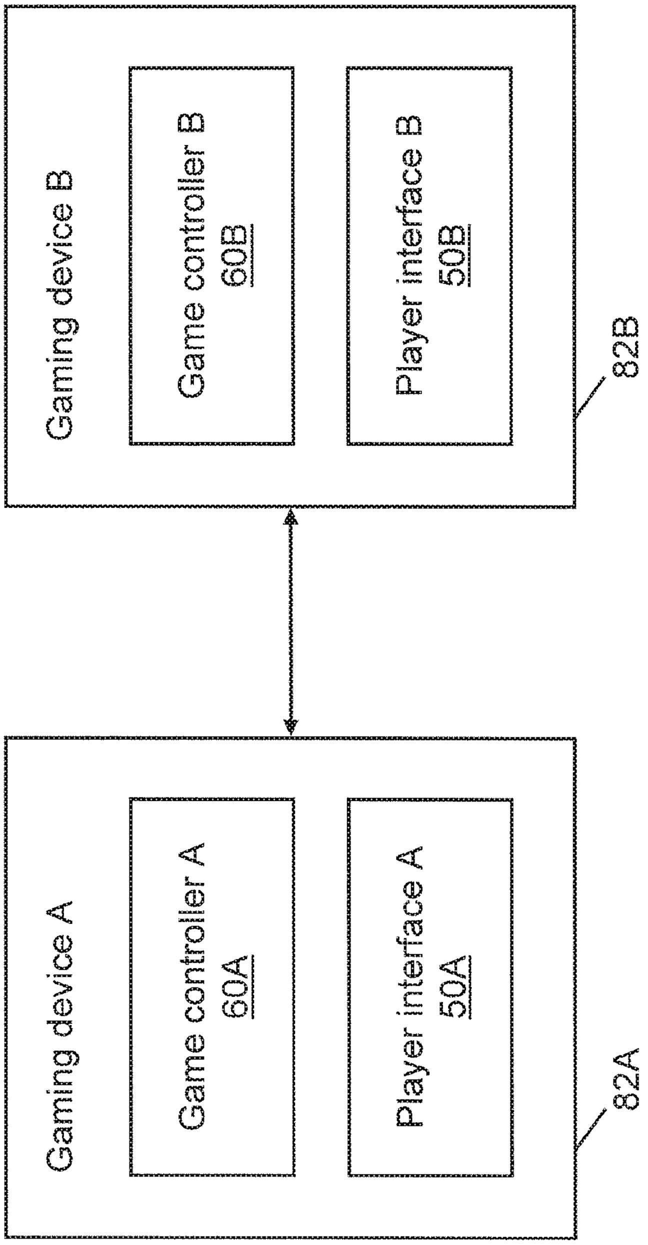
FIG. 1 is a functional block diagram of a gaming system.

In FIG. 1, there is illustrated a gaming system comprising a first gaming device 82A and a second gaming device 82B. The first gaming device 82A comprises a game controller 60A and a player interface 50A and is arranged to enable a first player to play a first game. The second gaming device 82B comprises a game controller 60B and a player interface 50B and is arranged to enable a second player to play a second game. In FIG. 1, the first gaming device 82A is arranged to modify play of the first game based on play of the second game, and the second gaming device 82B is arranged to modify play of the second game based on play of the first game. Advantageously, the gaming system enables two players playing two separate games to interact with each other.

In an embodiment, at least one of the first gaming device and the second gaming device modifies play by awarding a benefit to a player. For example, the first gaming device can modify play of the first game by awarding a benefit to the first player. In an embodiment, play at one gaming device can be modified in response to a modifier condition being met at the other gaming device. An example of a modifier condition is the collection of a special symbol. Examples of benefits include game play extensions (such as free games, re-spins or the like) and awards (such as bonus credits or multipliers).

In an embodiment, one or both of the first and second games are feature games. For example, the first game can be a feature game (sometimes referred to as a "bonus game") that is different from the normal base game typically provided by the gaming device. In another example, the first game can be free games of the base game. In an advantageous embodiment, the first game at the first gaming device is different to the second game at the second gaming device. Advantageously, this allows players playing two different games to interact with each other.

In an advantageous embodiment, either one of the first gaming device and the second gaming device initiates game play in response to a trigger condition being met. The other one of the first gaming device and the second gaming device then initiates play in response to the initiation of play triggered by the trigger condition. Thus, in one embodiment, players on two different gaming devices can play feature games in response to a trigger condition being met in a base game at just one gaming device.

In an embodiment, a game terminates when it reaches its natural conclusion on the triggering gaming device. In another embodiment, termination can be caused by a game terminating on the other gaming device.

In an embodiment, either one or both of the first and second feature games can also be displayed on an overhead display so that more than just the first or second player can easily view the play of the feature game.

In FIG. 1, only two gaming devices are illustrated. However, it is envisaged that there can be more than just two gaming devices in alternative embodiments. In one example, in addition to the first and second gaming devices, the gaming system can comprise a third gaming device arranged to enable a third player to play a third game wherein play of the third game is modified based on play of the first and/or second game.

General Construction of Gaming Devices

The gaming devices of the gaming system can take any suitable form including stand alone gaming machines and server based gaming terminals.

Figure 2:
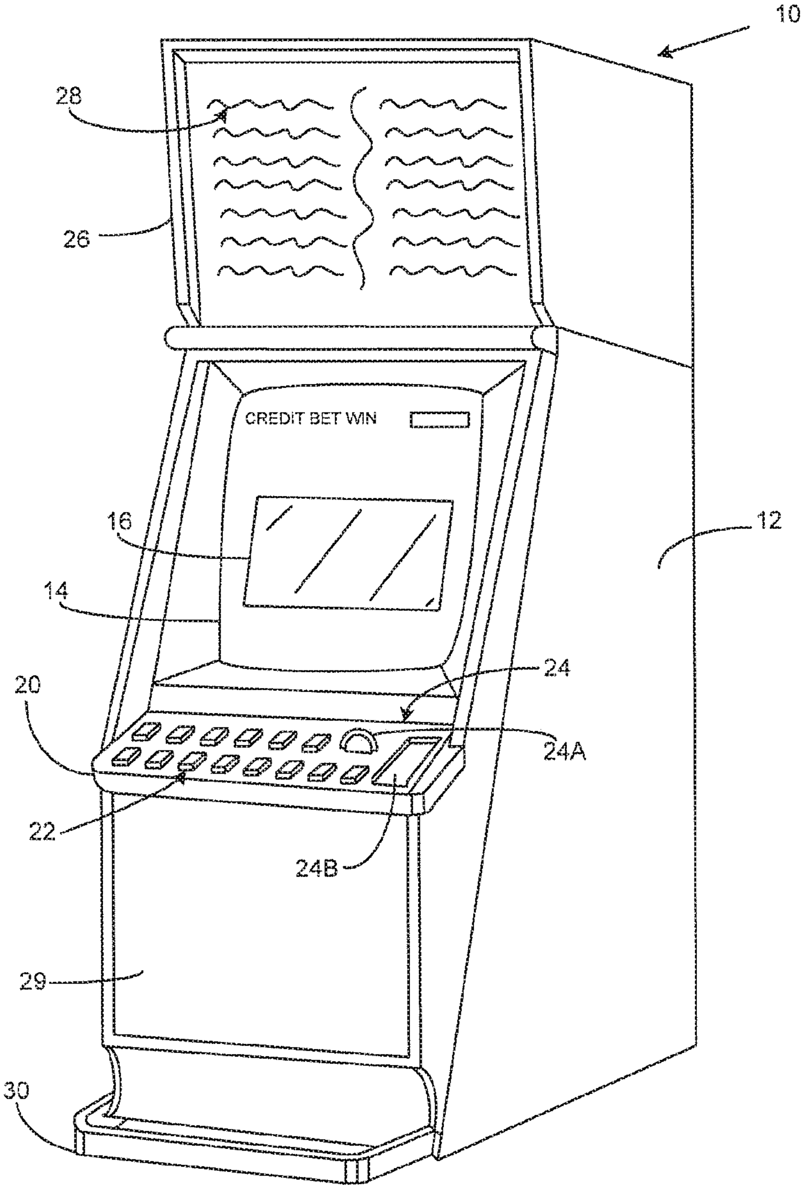
FIG. 2 is a perspective view of a gaming device in the form of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
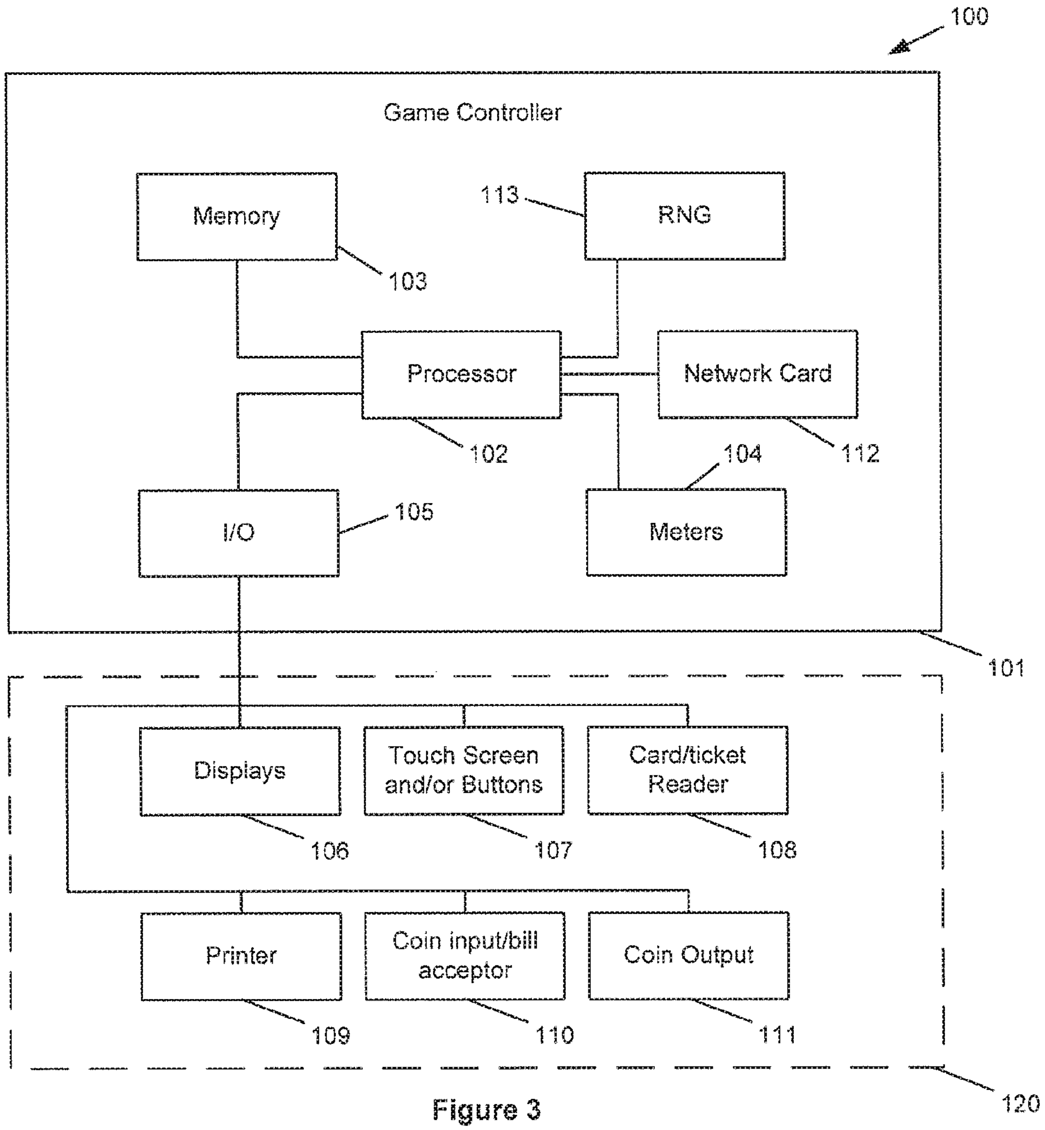
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
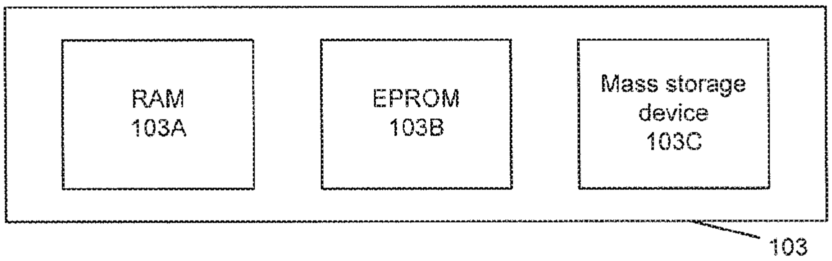
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 1038 may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference.

Figure 5:
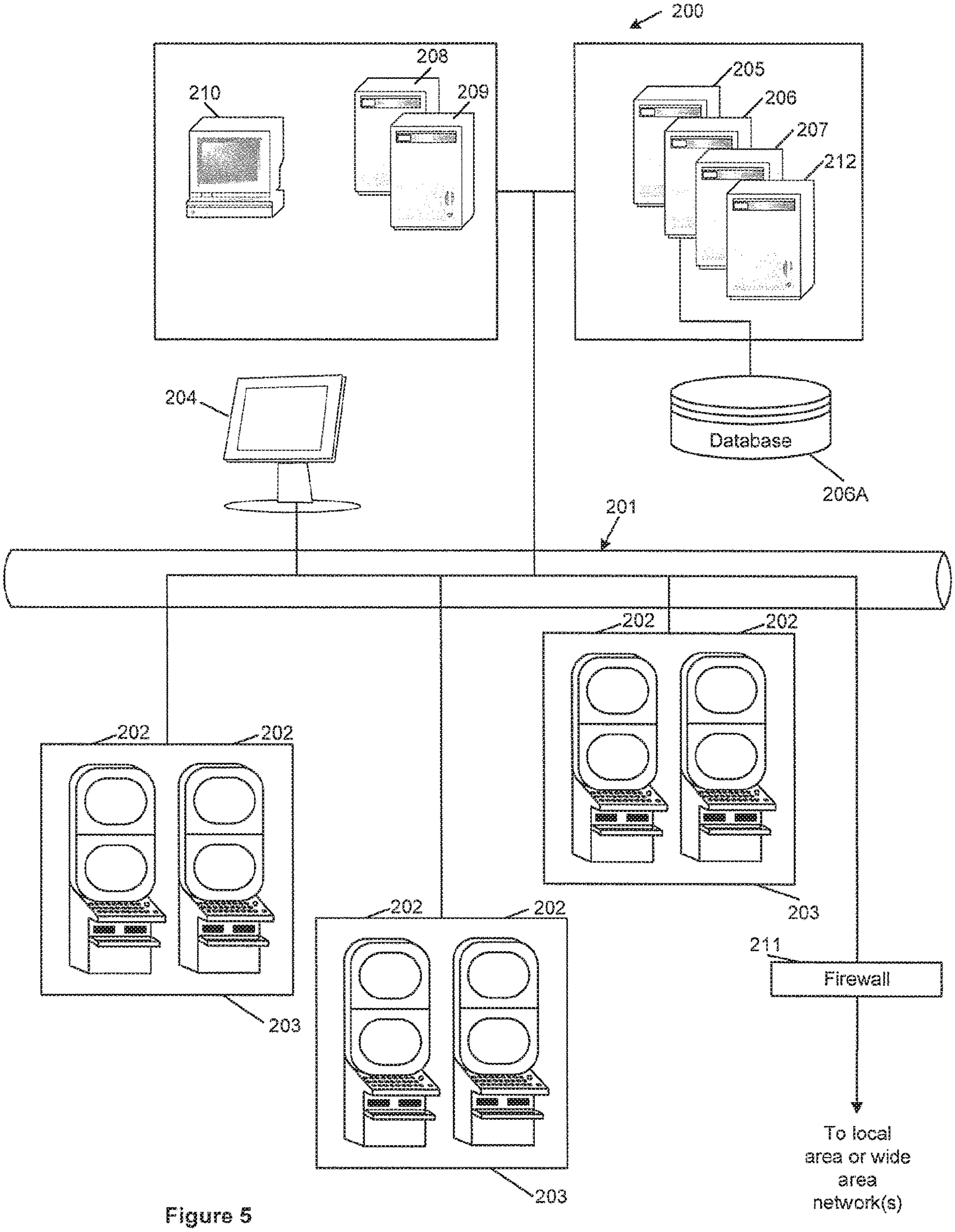
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

Although not shown in FIG. 5, the gaming machines 202 of each bank 203 may also be in direct data communication with each other. For example, each gaming machine may be directly connected to another gaming machine via an Ethernet network separate from the network 201. In another example, the gaming machines may be connected wirelessly via a wireless local area network (WLAN). In yet another example, there may simply be serial or parallel connections from each gaming machine to all the other gaming machines in the bank.

One or more displays 204 may also be connected to the network 201. For example, the displays 204 may be associated with one or more banks 203 of gaming machines. The displays 204 may be used to display representations associated with game play on the gaming machines 202, and/or used to display other representations, such as promotional or informational material. For example, an overhead display can be arranged above a bank of gaming machines so as to allow all players to easily view the play of others.

A game server 205 may be used to perform some of the processing required for certain games. For example, the game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
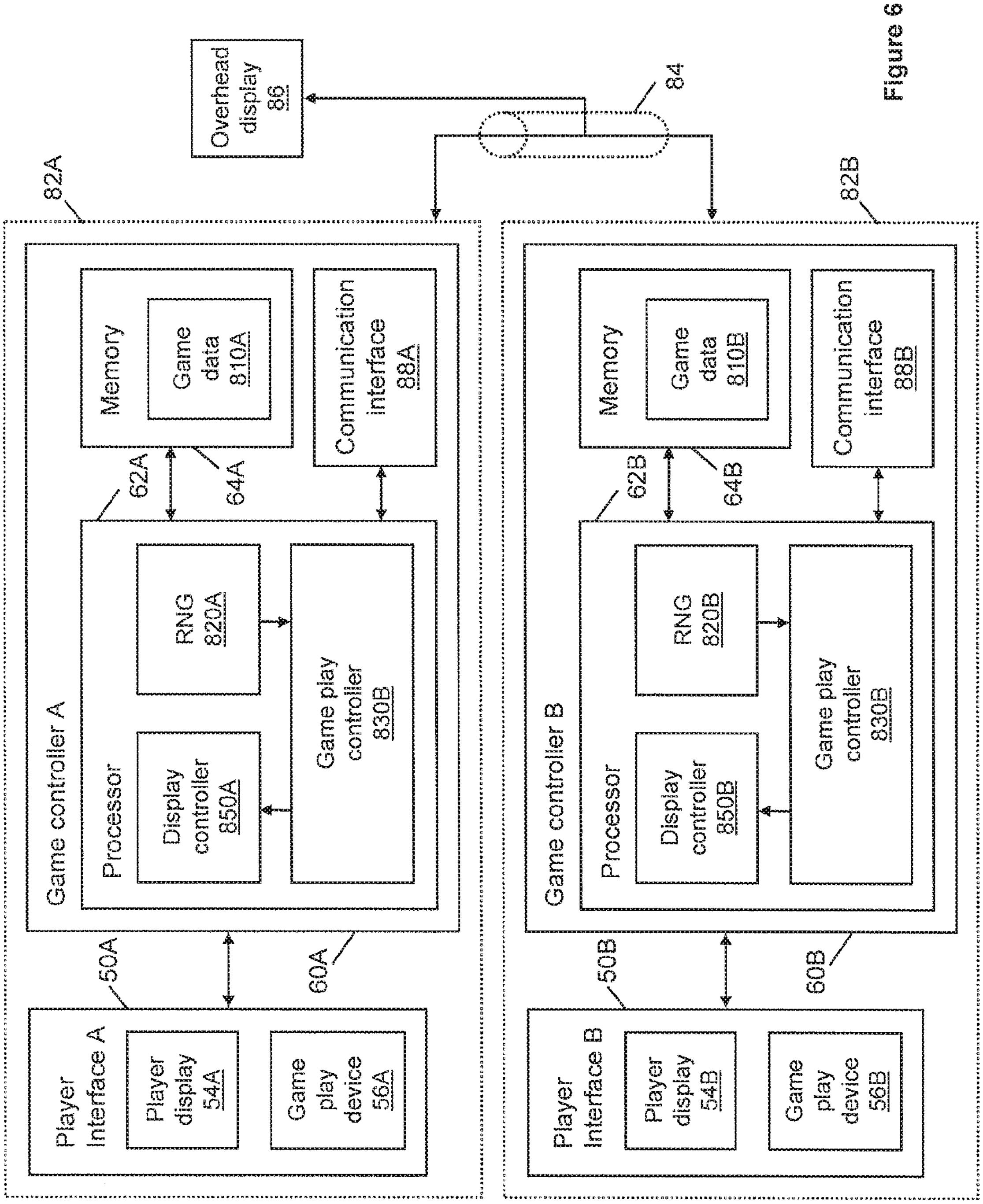
FIG. 6 is a functional block diagram of a gaming system.

FIG. 6 provides a more detailed illustration of a gaming system comprising two gaming devices 82. In this embodiment, each gaming device comprises a game controller 60 and a player interface 50. Each game controller comprises a processor 62 and memory 64. The processor 62 is arranged to implement a set of modules based on program code and data stored in memory 64 to enable a player to play a base game and a feature game using the player interface 50 and to modify play of the feature game on the gaming device based on play of the feature game played on the other gaming device.

Persons skilled in the art will appreciate that the modules are based typically on program code and data stored in a memory. Persons skilled in the art will also appreciate that the modules need not be implemented using a processor or be based on program code and data stored in a memory and that one or more of the modules could be implemented in some other way, for example by a dedicated circuit.

In FIG. 6, each gaming device 82 also comprise a communication interface 88 arranged to enable the processor 62 to communicate with the other gaming device via a network 84 so that the gaming device can modify play based on communication from the other gaming device. In addition, each gaming device 82 is also connected via the communication interface 88 to the network 84 to an overhead display 86. The overhead display is arranged to display either one or both feature games to both players.

In this embodiment, the gaming devices 82 and the overhead display 86 are all connected via a shared network. However, it is envisaged that in other embodiments, communication between gaming devices 82 and the overhead display 86 may be through individual communication links. For example, there may be a dedicated communication link between the gaming devices and a separate communication link between each of the gaming devices and the overhead display. It is also envisaged that in another embodiment, only one of the gaming devices may be connected to the overhead display. In yet another embodiment, each gaming device may be in communication with a controller which then passes on communication related to play modification to the other gaming device and/or the overhead display. Such a controller can also control play of one of games on the gaming devices and/or display this game on the overhead display.

In FIG. 6, the memory 64 of each gaming device 82 comprises game data 810 for implementing the rules of games playable on the gaming device, and each player interface 50 comprises a player display 54 for displaying games to a player and a game play device 56 including input devices such as a touch screen and/or buttons to enable a player to interact with the gaming device (for example, to play a game, a player may place a wager by making selection using one of the buttons and enter play instructions using a touch screen). In addition, the game play device 56 also allows a player to interact with the gaming device to learn game rules.

As discussed, the processor of each gaming device 82 is arranged to implement a set of modules. The modules include a Random Number Generator (RNG) 820, a game play controller 830, and a display controller 850. The Random Number Generator (RNG) 820 is arranged to generate random numbers for use by the game player controller 830. The game play controller 830 is arranged to conduct and modify a base game and a feature game that can be played by a player using the game play device 56 based on game data 810 and communication from communication interface 88. The display controller 850 is arranged to communicate with the game play controller 830 and the player display 54 to control the display to display the base game and the feature game to the player.

It will be appreciated that depending on the embodiment, the base games on the two gaming devices can be different. Furthermore, the feature games on the two gaming devices can also be different. For example, at the first gaming device, the base game can be a spinning-reel type game and the feature game can be "re-spin" type game; at the second gaming device, the base game can be card game and the feature game can be "Tarzan" themed arcade game (similar to those usually played on coin-operated entertainment machines at video arcades).

Persons skilled in the art will appreciate that the above components represent only the core components of an embodiment and that other components for conducting and modifying the base and/or feature games may be present. Persons skilled in the art will also appreciate that some of the above components may be implemented in a separate apparatus. For example, the random number generator may be implemented by a server arranged to generate random numbers for both gaming devices.

Figure 7:
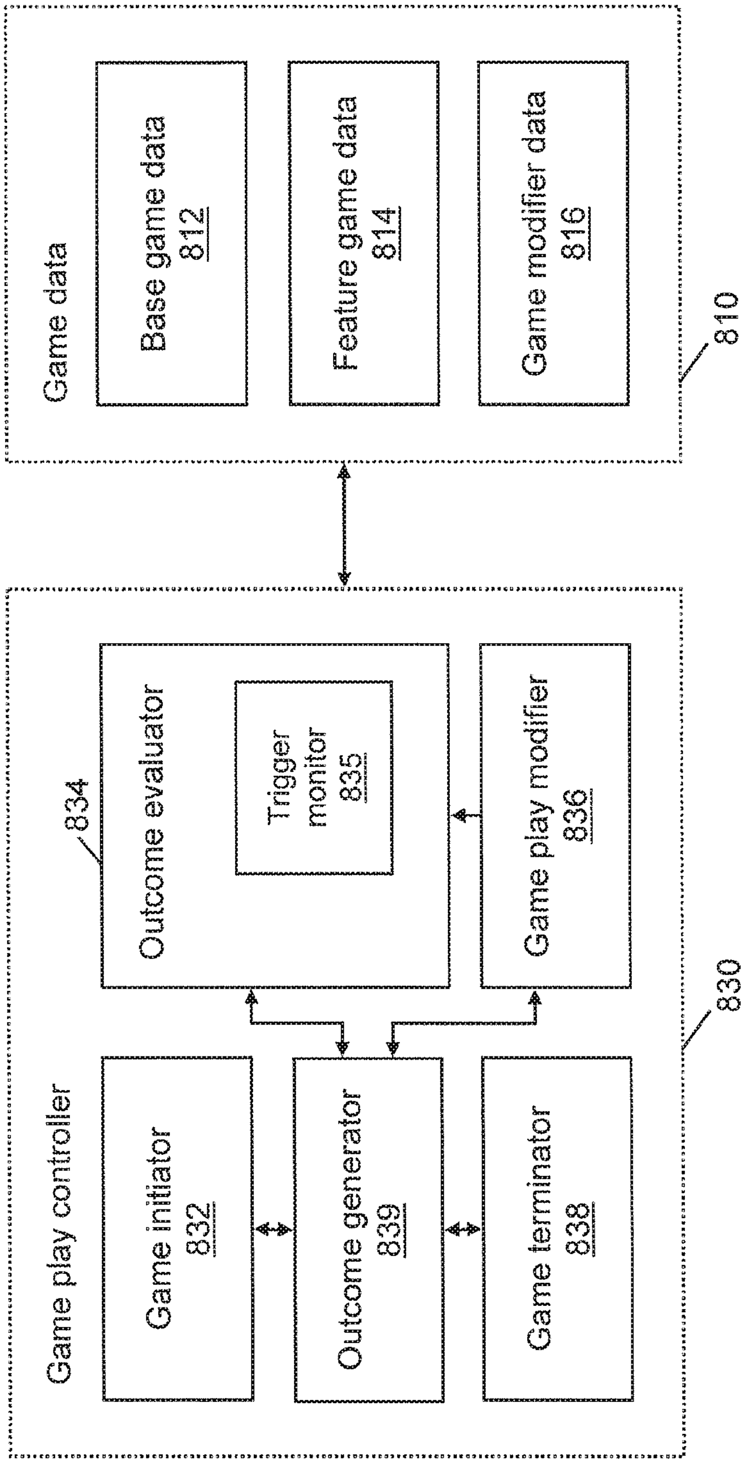
FIG. 7 is a functional block diagram of one of the game play controller and one of the game data of FIG. 6.

FIG. 7 provides a more detailed illustration of the game play controller 830 and the game data 810 of the game controller 60. The game play controller 80 comprises a game initiator 832, a game terminator 838, an outcome generator 839, an outcome evaluator 834, and a game play modifier 836. The game data 810 comprises base game data 812, feature game data 814, and game modifier data 816.

The outcome generator 839 is arranged to generate a game outcome. Random numbers provided by the random number generator 820 are used to generate game outcomes (for example, random numbers can be used to determine a symbol combination for a reel game).

The outcome generator 839 is arranged to generate game outcomes for the base game based on base game data 812. In addition, the outcome generator 839 is also arranged to generate game outcomes for the feature game based on feature game data 814. The base game is a game which is carried out each time the player makes a wager, typically irrespective of the wager. The feature game is carried out when a trigger condition is met. Known conventional base games include reel-games and card games. Types of feature games include: second screen games where game play is totally different to the base game (for example, a "pick a box type" game); games where there are additional games such as free games which are additional base games that are credited to players without charge, such as re-spins (where some reels are held while others are re-spun); and games which involve the same rules as base games but where the symbols on the reel are changed. The base game data 812 and the feature game data 814 can include: symbol sets, feature elements corresponding to different themes such as a particular movie, an animal etc.

The outcome evaluator 834 is arranged to evaluate game outcomes generated by the outcome generator 839. In this embodiment, the evaluation is used to determine whether to make an award or awards to a player and the outcome evaluator 834 is arranged to evaluate game outcomes for the base game based on base game data 812 and to evaluate game outcomes for the feature game based on feature game data 814. In this embodiment, the base game data 814 and the feature game data 816 include respective award data for the base and feature games and accordingly, the awards made to a player are different depending on whether the player is playing the base game or the feature game. For example, the outcome evaluator may make an award according to a first pay-table for the base game and may make an award according a second pay-table for the feature game. It will be appreciated that the award made to a player can also depend on the player's wager.

In this embodiment, a feature game is triggered by a game outcome on the gaming device and the outcome evaluator 834 comprises a trigger monitor 835 arranged to monitor whether one or more trigger conditions have been met by the game outcomes generated by the outcome generator 839. The trigger monitor 835 is also arranged to, subsequent to the occurrence of a trigger condition, trigger the outcome generator 839 to switch from generating game outcomes for a base game to generating game outcomes for a feature game. Person skilled in the art will appreciate that the trigger condition may be one or a combination of: the occurrence of a symbol combination in the base game, occurrence of a specific symbol in the base game, purchased, based on turnover, based on a random evaluation etc.

In the embodiment, the game initiator 832 is arranged to cause the initiation of a feature game at the gaming device in response to a feature game being initiated in the other gaming device. In this embodiment, the game initiator 832 does this by communicating with the other gaming device via the communication interface 88. In one example, each game initiator 832 can transmit a game initiation message to the other game initiator 832 via the communication interface 88. Persons skilled in the art will appreciate that in some embodiments, the game initiator can also determine whether a game has been initiated at the other gaming device by polling the other gaming device. As discussed above, it will be appreciated that a feature game can be initiated also by a trigger condition being met (that is, a feature game can also be triggered by the trigger monitor and not just by the game initiator).

The game play modifier 836 is arranged to cause the modification of play of a game at the gaming machine in response to a modifier condition being met at the other gaming device; that is, the game play modifier of the first gaming device 836A can cause play modification at the first gaming machine in response to a modifier condition being met at the second gaming device 836B and the second game play modifier 836B can cause play modification at the second gaming machine in response to a modifier condition being met at the first gaming device 836A. In this embodiment, play modification is carried out based on communication from the other gaming device via the communication interface 88 and the game modifier data 816. For example, the game play modifier 836A of the first gaming device 82A can communicate to the second gaming device 82B when a modifier condition is met at the first gaming device 82A, the modifier condition being stored in the game modifier data 816A of the first gaming device 82A such that the first gaming device 82A knows the modifier condition which must be met. In response to receipt of this communication, the game play modifier 836B of the second gaming device 82B modifies play of the game at the second gaming device 82B. Persons skilled in the art will appreciate that the determination of whether a modifier condition is met at a gaming device can also be made by the game play modifier at the other gaming device based on game modifier data at the other gaming device. For example, whether a modifier condition is met at the first gaming device 82A can be determined by the game play modifier 836B of the second gaming device 82B, based on communication from the first gaming device 82A to the second gaming device 82B that a particular game outcome has occurred at the first gaming device 82A. Thus, play at one gaming device can meet a modifier condition to cause modification of game play at the other gaming device and vice versa, and the modifier condition and/or the modifier itself can be stored in the game modifier data of either of the gaming devices depending on the implementation.

In an embodiment, a modifier condition is a game outcome, for example, the collection of a special symbol (such as a WILD symbol) in a spinning reel-type game. Persons skilled in the art will appreciate that a modifier condition can be tied to any one or more objectives a player might achieve during a game including: fending off a crocodile in a "Tarzan" themed game as described in the example below.

In this embodiment, the game play modifier 836 causes play modification by communicating with the outcome generator 839 and/or the outcome evaluator 834 to control the manner in which they generate and/or evaluate game outcomes. Thus, either the manner in which game outcomes are generated, the manner in which game outcomes are evaluated, or the manner in which both the game outcomes are generated and evaluated can be modified by the game play modifier 836 depending on the modifier condition stored in the game modifier data 816. In this embodiment, play modification is a benefit made to the player, the play modification being determined by the game play modifier 836 based on game modifier data 816. In one example, game modifier data may include a benefit that awards a certain number of free games. In another example, the game modifier data may be a multiplier. Examples of other benefits include game play extensions such as re-spins and awards such as bonus credits etc. Persons skilled in the art will appreciate that in some embodiments the game play modifier can be arranged to communicate with only one instead of both the outcome generator and the outcome evaluator. It is envisaged that the game play modifier is intended to facilitate interaction between the two players. Persons skilled in the art will appreciate that although the above discusses only providing a benefit to players, interaction between the two players can not only have a positive impact on a player's play but that in other embodiments the interaction can also have a negative impact on a player's play. For example, instead of providing free games, the occurrence of a particular game outcome at the other gaming device may result in free games being taken away at a gaming device.

The game terminator 838 is arranged to cause the termination of a feature game at the gaming device in response to a feature game being terminated at the other gaming device. In this embodiment, the game terminator 838 is in communication with the other gaming device via the communication interface 88 for this reason. Persons skilled in the art will appreciate that the game terminator, like the game initiator, can determine whether a game has been terminated at the other gaming device in a variety of ways, including by having a gaming device continually poll the other gaming device or by having one gaming device sending a game termination message to the other gaming device when a game has been terminated at the gaming device. Persons skilled in the art will appreciate that in some embodiments, a game can also terminate by itself upon reaching its natural conclusion. Persons skilled in the art will also appreciate that in some embodiments, the game terminator can terminate not only the feature game but also the base game.

Persons skilled in the art will appreciate that in some embodiments, the occurrence of a trigger condition may trigger a play modification of existing play instead of initiating play of a feature game. That is, in some embodiments, depending on the type of modifier and/or trigger conditions that has been met, any one of the game initiation, game play modification and game termination may be caused. For example, rather than causing a feature game to be initiated, ongoing play of the base game on a gaming device may be modified in response to a trigger condition by applying a multiplier. In another example, a feature game may be initiated in response to a trigger condition, but rather than terminating in response to a game being terminated at the other gaming device, the game may only terminate after it has been conducted for a pre-determined period.

Figure 8:
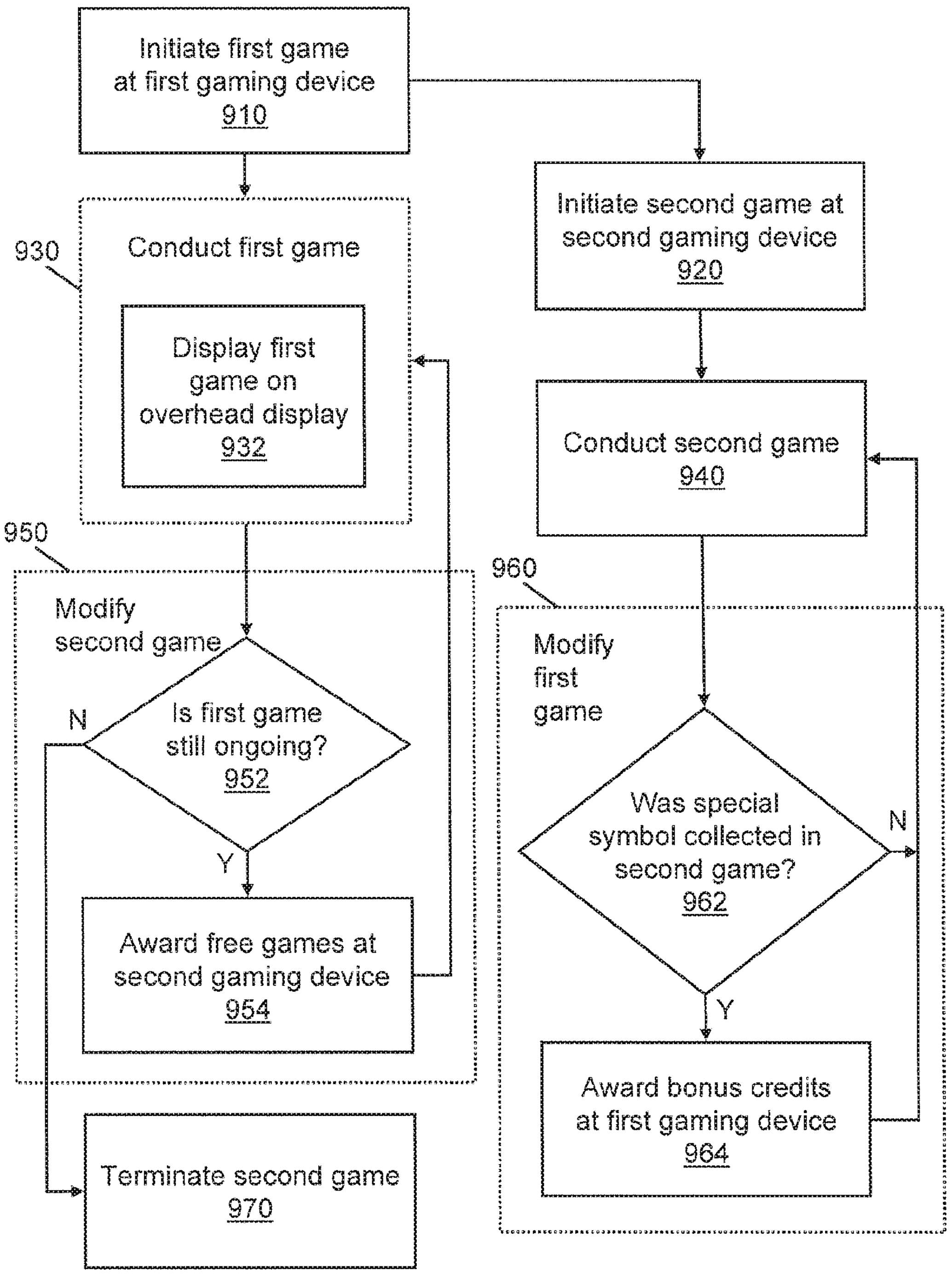
FIG. 8 is a flow chart of a method of gaming.

FIG. 8 provides a flow chart which summarises an example of the method of gaming. The method involves, subsequent to a trigger condition being met in a base game on a first gaming device, initiating a first feature game at the first gaming device 910 for a first player. A second feature game is then initiated for a second player at a second gaming device in response to the first feature game being initiated 920. When the first gaming device is conducting the first feature game 930, the first feature game is displayed by the first gaming device and also on an overhead display 932. When the first gaming device is conducting the first feature game, the second feature game is modified by providing a benefit to the second player 950. For example, as long as the first feature game is ongoing 952, free games are awarded at the second gaming device 954. Otherwise, the second feature game is terminated in response to the termination of the first feature game 970. When a second modifier condition is met during the play of the second feature game 940, a benefit is awarded to the first player. For example, whenever a special symbol is collected in the second feature game, bonus credits are awarded at the first gaming device 964.

It will be appreciated that in one embodiment, two players playing different games on separate gaming devices can interact with each other by providing each other with benefits. For example, the first player can be awarded with free games subsequent to the second player collecting a special symbol. It will be appreciated that the benefit can depend on the type of game being played at the gaming device.

It will also be appreciated that in another embodiment, two players playing different games on separate gaming devices can interact with each other by initiating and/or terminating a game on the other gaming device. In one example, a feature game can be initiated at the first gaming machine in response to the second player collecting a special symbol. In another example, a feature can be terminated at the first gaming machine in response to a feature game reaching its natural conclusion at the second gaming device.

Finally, it will be appreciated that interaction between two players playing different games on separate gaming devices can involve both providing benefits to the other gaming device, and initiating a game on the other gaming device or terminating a game on the other gaming device.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

Example

In this example, there is provided a gaming system consisting of a bank of two gaming machines linked by Aristocrat Leisure Industries Pty Ltd's Hyerlink™ technology.

A feature game "Tarzan" can be triggered at the first gaming machine from a base game. The feature game can be triggered either randomly or upon a particular symbol combination being obtained in the base game.

Once triggered, the "Tarzan" feature game is displayed on both the first gaming machine and the overhead display. In response to the "Tarzan" feature game being triggered, the second gaming machine initiates a feature game different from the "Tarzan" feature game.

One of the objectives in the "Tarzan" game is to hold off a crocodile. As long as the crocodile is being held off, the first gamine machine communicates to the second gaming machine that the "Tarzan" feature game is ongoing so that the second gaming machine can modify play at the second gaming machine by awarding free games. In this example, free games are awarded at the second gaming machine so long as a player holds off the crocodile in the "Tarzan" feature game on the first gaming machine.

Play at the first gaming machine is also modified in response to play at the second gaming device. When winning symbols are collected at the second gaming machine, the second gaming machine communicates this to the first gaming machine and bonus credits are then awarded at the first gaming machine.

The "Tarzan" game concludes when the player fails to hold off the crocodile. Subsequent to the "Tarzan" game being terminated, the feature game at the second gaming machine also terminates.

It will be understood to persons skilled in the art of the invention that many modifications may be made without departing from the spirit and scope of the invention, in particular it will be apparent that certain features of the above examples and embodiments of the invention can be employed to form further embodiments.

For example, in one embodiment, the overhead display can be part of one of the two gaming device (for example, as an extension to the first gaming device) instead of being a separate entity.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming using a first gaming machine having at least one first display device, a first controller and memory device configured to operate the first gaming machine, a first communication interface, and a first input device configured to receive game play instructions, and a second gaming machine having at least one second display device, a second controller and memory device configured to operate the second gaming machine, a second communication interface, and a second input device configured to receive game play instructions, the first gaming machine communicatively coupled over a network to the second gaming machine via the first communication interface and the second communication interface, the method comprising:

conducting, in response to a wager received at the first gaming machine, a first game having a continuous objective;

conducting a second game at the second gaming machine during play of the first game at the first gaming machine; and modifying play of the second game for as long as the continuous objective is being met during play of the first game.

2. The method of claim 1, wherein the first game terminates when the continuous objective ceases being met.

3. The method of claim 1, wherein the second game is a different game than the first game.

4. The method of claim 1, further comprising terminating play of the second game at the second gaming machine in response to play of the first game being terminated at the first gaming machine.

5. The method of claim 1, wherein the second game is a game of chance comprising collecting a plurality of symbols including at least one winning symbol.

6. The method of claim 5, further comprising modifying play of the first game based on the number of winning symbols collected in the second game.

7. The method of claim 6, wherein at least one of:

modifying play of the first game comprises awarding a benefit to a first player of the first game, and modifying play of the second game comprises awarding a benefit to a second player of the second game.

8. The method of claim 1, further comprising:

triggering the first game on the first gaming machine during play of a first base game by a first player, wherein the first game is a first feature game, and initiating the first feature game in response to a trigger condition being met in the first base game at the first gaming machine.

9. The method of claim 8, further comprising triggering the second game on the second gaming machine in response to the first game being triggered, wherein the second game is a second feature game.

10. The method of claim 8, wherein at least one of:

conducting the first game comprises displaying the first game on an overhead display, and conducting the second game comprises displaying the second game on the overhead display.

11. A gaming system comprising:

a first gaming machine having at least one first display device, a first controller and memory device configured to operate the first gaming machine, a first communication interface, and a first input device configured to receive game play instructions, the first gaming machine configured to:

receive a wager; and conduct a first game having a continuous objective in response to receiving the wager; and a second gaming machine having at least one second display device, a second controller and memory device configured to operate the second gaming machine, a second communication interface, and a second input device configured to receive game play instructions, the second gaming machine communicatively coupled to the first gaming machine over a network via the first communication interface and the second communication interface, the second gaming machine configured to:

conduct a second game at the second gaming machine during play of the first game at the first gaming machine; and modify play of the second game for as long as the continuous objective is being met during play of the first game.

12. The gaming system of claim 11, wherein the first gaming machine terminates the first game when the continuous objective ceases being met.

13. The gaming system of claim 11, wherein the second game is a different game than the first game.

14. The gaming system of claim 11, wherein the second gaming machine is configured to terminate play of the second game in response to play of the first game being terminated at the first gaming machine.

15. The gaming system of claim 11, wherein the second game is a game of chance comprising collecting a plurality of symbols including at least one winning symbol.

16. The gaming system of claim 11, wherein the first gaming machine is configured to modify play of the first game based on play of the second game.

17. The gaming system of claim 16, wherein at least one of:

the first gaming machine is configured to modify play of the first game by at least awarding a benefit to a first player of the first game, and the second gaming machine is configured to modify play of the second game by at least awarding a benefit to a second player of the second game.

18. The gaming system of claim 11, wherein the first gaming machine is configured to:

trigger the first game during play of a first base game by a first player, wherein the first game is a first feature game, and initiate the first feature game in response to a trigger condition being met in the first base game at the first gaming machine.

19. The gaming system of claim 18, wherein the second game is triggered on the second gaming machine in response to the first game being triggered, wherein the second game is a second feature game.

20. The gaming system of claim 11, comprising an overhead display configured to display one or both of the first game and the second game.

* * * * *